United States Patent [19]

Johnson

[11] 4,054,192
[45] Oct. 18, 1977

[54] OVERRUNNING CLUTCH CAGE

[75] Inventor: Lawrence P. Johnson, Huron, Ohio

[73] Assignee: General Motors Corporation, Detroit, Mich.

[21] Appl. No.: 766,485

[22] Filed: Feb. 7, 1977

Related U.S. Application Data

[63] Continuation of Ser. No. 622,242, Oct. 14, 1975, abandoned.

[51] Int. Cl.² .............................................. F16D 41/06
[52] U.S. Cl. ............................................................ 192/45
[58] Field of Search .................... 192/45, 45.1; 188/82, 188/84

[56] References Cited

U.S. PATENT DOCUMENTS

| 3,543,894 | 12/1970 | Giese | 192/45.1 |
| 3,598,213 | 8/1971 | Giese et al. | 192/45.1 |
| 3,702,649 | 11/1972 | Giese et al. | 192/41 A |
| 3,917,036 | 11/1975 | Johnson et al. | 192/45 |

Primary Examiner—Allan D. Herrmann
Attorney, Agent, or Firm—F. J. Fodale

[57] ABSTRACT

An overrunning clutch cage consists of a plurality of short, molded plastic segments which snap together end-to-end to form an annulus. The manner in which the segments are connected facilitates assembly and permits adjustments for conformity between the clutch races. The adjustments in conjunction with the accurate radial dimensions of the segments improves centering of the races. The segments are designed for being molded in a two part mold and the resulting cage forms a subassembly with the clutch rollers and roller biasing springs.

6 Claims, 9 Drawing Figures

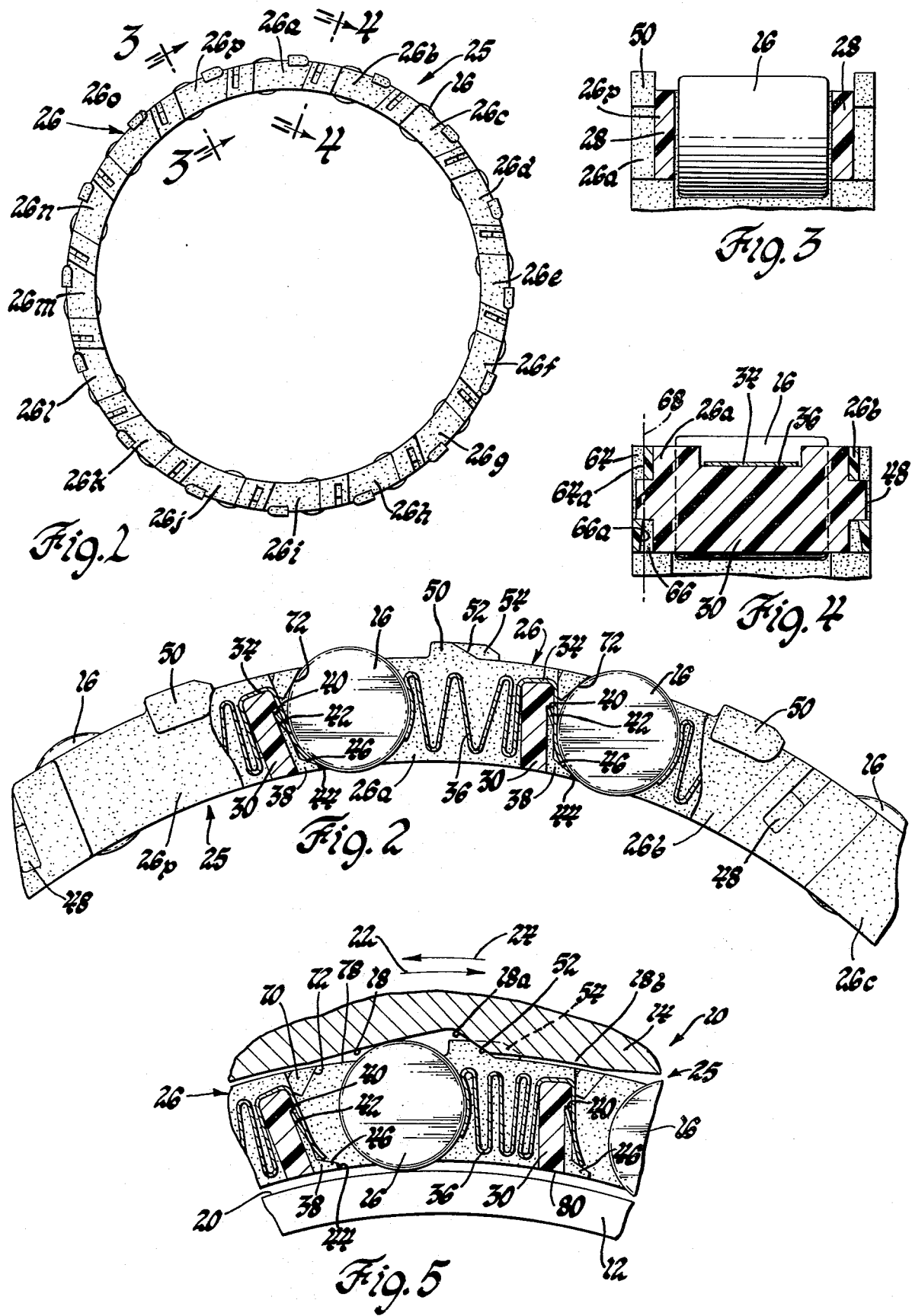

OVERRUNNING CLUTCH CAGE

This is a continuation of application Ser. No. 622,242 filed Oct. 14, 1975, now abandoned.

This invention relates generally to overrunning clutches and more particularly to cages for overrunning clutches.

In the prior U.S. Pat. No. 3,732,956 issued to Lawrence P. Johnson and Oscar Kitchin on May 15, 1973 for an "Overrunning Clutch with Centering Means and Unit Handled Subassembly Therefor" there is disclosed an overrunning clutch provided with a sheet metal cage which carries a number of molded plastic bearing blocks. The bearing blocks center the clutch races with respect to each other and also cooperate in providing a unit handled subassembly of caged spring biased rollers for the clutch. The molded bearing blocks provide excellent centering because the bearing blocks can be molded with very accurate radial dimensions.

In a copending United States Patent Application Serial No. 427,903 now U.S. Pat. No. 3,917,036 filed by Lawrence P. Johnson and Oscar Kitchin on Dec. 26, 1973 for a "Molded Cage for an Overrunning Roller Clutch" there is disclosed a one piece molded plastic cage for an overrunning clutch which is annular and shaped to be molded in a two part mold. Molding an annulus with very accurate radial dimensions for centering races however, is very difficult because circumferential shrinkage effects the radial dimensions of diametrical opposed portions of the cage as well as the diametral distance between them.

The object of this invention is to provide a cage consisting entirely of a plurality of short molded plastic segments which snap together end-to-end to form an annulus.

A feature of the invention is that the cage may be made entirely of molded plastic and yet have very accurate radial dimensions for accurate centering of clutch races with respect to each other.

Another feature of the invention is that the molded plastic cage segments are connected in a manner which facilitates assembly of the segments and permits adjustments in roundness and circumferential dimensions of the assembled cage for conformity to the annular space between the clutch races.

Another feature of the invention is that the cage segments are designed for being molded in a two part mold and the cage assembled from the segments includes roller retaining lips for retaining the rollers in a unit handled subassembly in the absence of the clutch races.

Another feature is that the cage segments are relatively flexible for assembly and yet substantially rigid for transferring the spring reaction forces to one of the clutch races.

Another feature is that the means for connecting adjacent cage segments are incorporated in each segment in such a manner that the cage segments may be molded in a two part mold.

The exact nature of this invention as well as other objects and advantages thereof will be readily apparent from consideration of the following specification relating to the drawings in which:

FIG. 1 is a front view of a roller clutch subassembly having a cage in accordance with this invention;

FIG. 2 is an enlarged fragmentary view of the clutch subassembly shown in FIG. 1 partially broken away to illustrate internal detail;

FIG. 3 is a section taken substantially along the line 3—3 of FIG. 1;

FIG. 4 is a section taken substantially along the line 4—4 of FIG. 1;

FIG. 5 is an enlarged fragmentary view of a complete roller clutch having the subassembly shown in FIG. 1;

Figure 6:
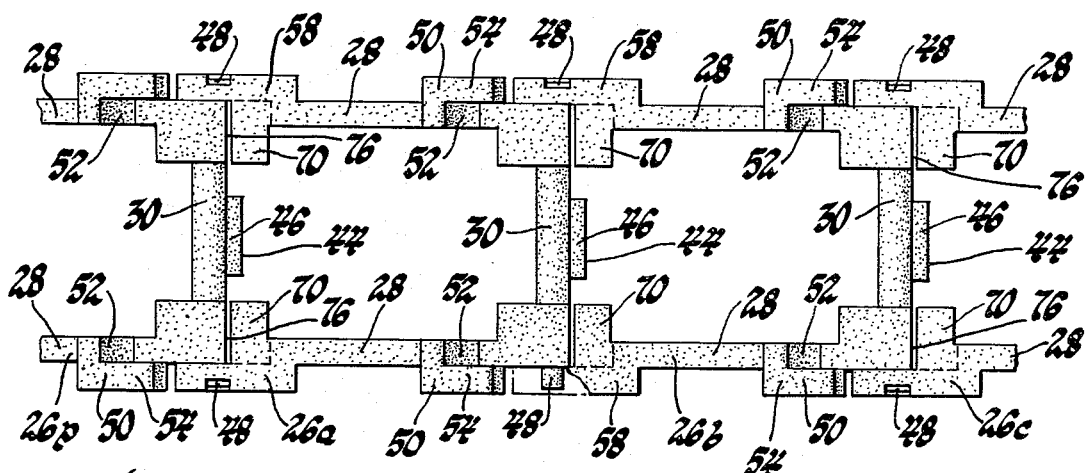
FIG. 6 is a plan view of the cage shown in FIGS. 1 through 5.

Referring now to the drawings and more particularly to FIG. 5, there is illustrated an overrunning clutch 10 comprising an inner race 12 and an outer race 14 having a plurality of rollers 16 disposed therebetween. The rollers 16 engage cam surfaces 18 of the outer race 14 and an outer cylindrical surface 20 of the inner race 12 for preventing relative rotation of the races in one direction while allowing freewheeling or overrunning in the other. For instance, in the clutch 10 illustrated in FIG. 5, the rollers 16 prevent the outer race 14 from rotating in the clockwise direction relative to the inner race 12 as indicated by the arrow 22. On the other hand, the outer race 14 is freely rotatable with respect to the inner race 12 in the counterclockwise direction as indicated by the arrow 24.

The rollers 16 are part of a unit-handled subassembly 25 which includes a cage 26 which is generally annular in form and comprises a plurality of short molded plastic segments 26a, 26b, 26c. . . . 26p as best illustrated in FIG. 1.

The cage illustrated in the drawings has sixteen segments joined end-to-end in an annulus forming a corresponding number of pockets which individually receive one of a corresponding number of rollers 16.

Figure 7:
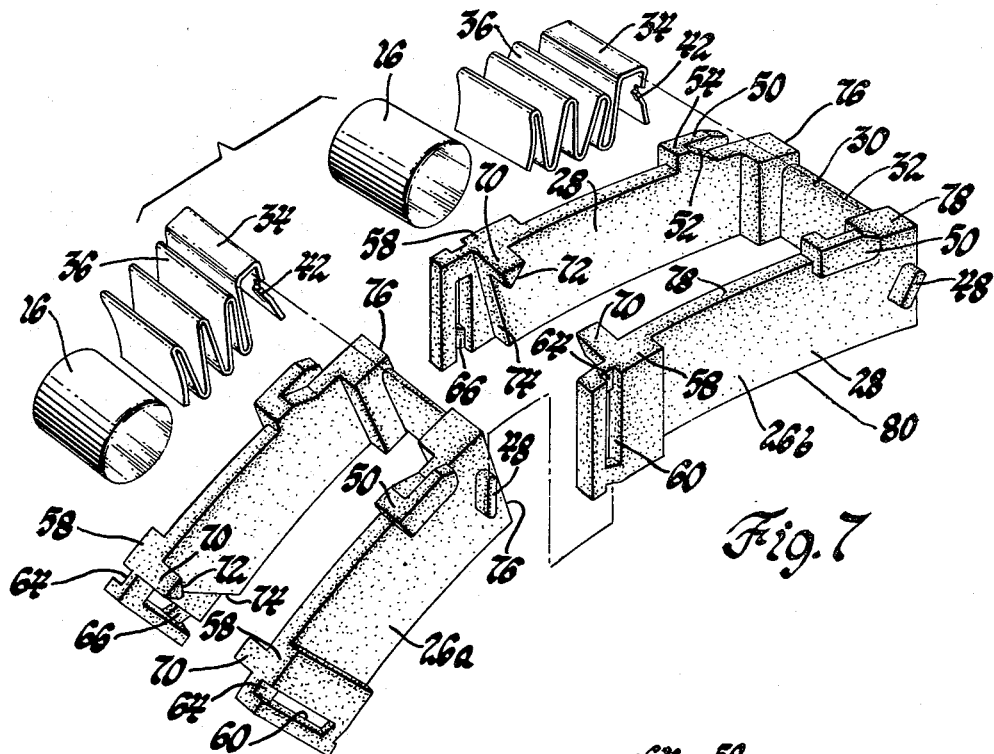
FIG. 7 is an exploded perspective view of a portion of the subassembly shown in FIG. 1.

The segments are preferably identical for reasons of economy. FIG. 7 is an exploded view showing the two adjacent segments 26a and 26b illustrated in FIG. 1. Since each segment is typical of the rest, the segment 26b will be described in detail, it being understood that each of the remaining segments have corresponding portions identified with the same numerals.

Figure 8:
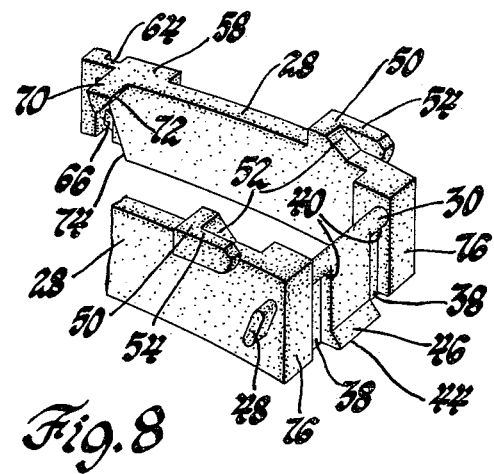
FIG. 8 is a fragmentary perspective view of one of the cage segments shown in FIG. 7.

The segment 26b is arcuate in elevation and generally U-shaped in plan form and comprises a pair of laterally spaced side rails 28 connected at one end by a cross bar 30. The cross bar 30 has a mid portion 32 of reduced height and width upon which an integral clip 34 of an accordian shaped spring 36 is mounted. The outboard face of the cross bar 30 as shown in FIG. 8 has two grooves 38 which extend up from the inner surface of the cross bar part way up forming shoulders 40 which cooperate with tabs 42 struck out of the mounting clip 34 of the spring 36 to retain the spring on the cross bar. (See FIGS. 2 and 3). The cross bar 30 also has a lower (or inner in the context of an annulus) projecting lip 44 located between the grooves 38. The lip 44 has a surface 46 which diverges away from the cross bar 30 in the downward (inward in the context of an annulus) for roller retention as will hereinafter more fully appear.

The cross bar configuration described above is designed for being molded in a two part mold of suitable construction. Briefly, the lower mold part would include fingers for forming the grooves 38 and shoulders 40 while the upper mold part would have a cavity for forming the lip 44.

The segment 26b also includes a pair of laterally spaced posts 48 which project laterally from the side rails 28 respectively. The posts 48 are located on the relatively rigid ends of the side rails 28 connected by the cross bar 30. In elevation, the posts are generally rectangular with rounded shorter sides and are chordally disposed, that is the centerline between the longer sides of the posts does not intersect the axis of the cage as clearly illustrated in FIG. 1. This chordal orientation is preferable to facilitate assembly of the last segment of the cage to the first as will hereinafter more fully appear.

Each side rail 28 also includes a radially projecting ear 50 which includes a reaction surface 52 which engages the cam hook surface 18a of the clutch outer race 14 to properly locate each particular segment of the cage 26. The ears 50 also include outboard portions 54 which engage the radial faces of the outer clutch race 14 adjacent the cam hook surfaces 18a for axial location. The function of the ears 50, and the manner in which a cage having such ears is assembled to an outer cammed race are more particularly described in the patent application referred to in the introduction. Briefly the cage with the ears 50 aligned with cavities formed by the surfaces 18 and 18a is slid axially into the outer race 14 and indexed circumferentially to the position shown in FIG. 5.

The ears of the particular configuration shown in the drawing may be molded integral with the typical segment 26b in a two part mold of suitable construction. Briefly the lower undercut portions of the ears projecting laterally from the side rails 28 would be molded in a cavity in a lower mold part which can be separated from the upper mold part without interferring with the molded ears or the posts which for this purpose are spaced from the ears in the circumferential direction.

The free ends of the rails 28 have laterally offset portions 58 provided with generally rectangular sockets 60 formed in a unique manner to facilitate molding of the sockets in a two part mold. More particularly, the sockets 60 extend laterally through the offset portions 58 and each offset portion has chordal slots 66 and 64 in their confronting and opposite surfaces respectively, which are aligned with the sockets 60. The slots 64 extend from the upper or outer surface of the rails 28 to the sockets 60 and the slots 66 extend from the lower or inner surface of the rails 28 to the sockets 60. Further the slots 64 and 66 are of sufficient depth and configurated so that their respective bottom surfaces 64a and 66a are located entirely on opposite sides of an imaginary medial plane 68 extending radially through the socket 60 as shown in FIG. 4. Furthermore, the bottom surfaces 64a and 66a of the slots 64 and 66 are not undercut. That is the surfaces have no elemental portions closer to the plane 68 than the next elemental portion closer to the socket 60 so that the sockets 60 may be formed in a two part mold by fingers on each mold part which overlap in the middle to form the through socket 60.

The slots 66 also serve to guide the posts 48 of an adjacent segment into the sockets 60 and to this end the bottom surfaces 66a preferably coverage toward each other in the radial outward direction to provide cam surfaces for spreading the end portions 58 during the snap assembly of two adjacent segments.

The segment 26b also includes an upper or outer pair of lips 70 which project toward each other from the rails 28. The lips 70 have roller retention surfaces 72 which converge toward the cross bar 30 in the upper or radial outward direction. The surfaces 72 cooperate with the surface 46 of the lip 44 an adjacent cross bar to retain the rollers 16 biased by the springs 36 in the roller pockets for providing a unit handled subassembly 25 as shown in FIGS. 1 and 2. Once the subassembly 25 is assembled between the races 12 and 14 as shown in FIG. 5, the rollers assume operative positions spaced from the retaining lips but the races themselves provide radial retention.

The segment 26b also includes radial faces 74 coplanar with respective surfaces of the lips 70. The surfaces 74 cooperate with the radial faces of an adjacent segment corresponding to the radial faces 76 of the segment 26b shown in FIG. 8 as will hereinafter more fully appear. The surfaces 72 and 74 and the lower or inner surfaces of the lips 70 may be formed by the lower mold part in a two part mold.

As mentioned previously the segment 26b is arcuate in elevation. Preferably, the entire inner and outer surfaces of the side rails 28 are concentric part cylindrical bearing surfaces 80 and 78 which mate with a close slip fit respectively with the cylindrical surface 20 of the inner race 12 and the part cylindrical portions 18b of the outer race 14. During clutch lock-up, the cage 26 does not rotate with respect to either race. During the overrunning mode of operation, the cage 26 travels with the outer race 14 and rotates with respect to the cylindrical race in this particular instance the inner race 12. Consequently, there is little or no movement of the cage 26 with respect to the outer race 14. It is to be noted that part cylindrical portions 18b of the outer race are engaged by the thicker portions of bearing surfaces 78 of the side rails 28 which compensate somewhat for the fact that the cage 26 does not engage the entire inner surface of the outer race 12.

The cage 26 comprises several segments 26a, 26b, 26c, etc., joined together end-to-end in an annulus. Briefly the cage is assembled by snapping the posts 48 of a first segment in the sockets 60 of a second segment and repeating the process with each adjacent segment until, the last segment is connected to the first segment to form an annulus.

More particularly, in reference to FIG. 7, the first segment 26a is assembled to the second segment 26b by placing the segment 26a below or radially inwardly of the segment 26b and inserting the posts 48 of the segment 26a into the slots 66. The segment 26a is then moved upwardly or radially outwardly spreading the resilient side rails 28 of the segment 26b apart by a camming action until the posts 48 snap into the sockets 60. The posts 48 are slightly undersized with respect to the sockets 60 to permit a slight rocking of the two connected segments with respect to each other. The rocking and slight adjustments in spacing in the circumferential direction is limited by the fit between the posts 48 and the sockets 60 and also by engagement of the surfaces 76 of segment 26a with the surfaces 74 of segment 26b.

Figure 9:
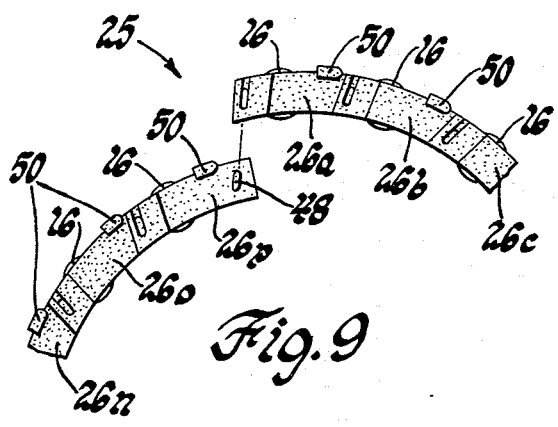
FIG. 9 is a schematic view of the cage in the last stage of assembly.

The segment 26b is then snap assembled to segment 26c in the same manner and the process is repeated until the requisite number of segments are connected end-to-end. Referring now to FIG. 9, assembly of the cage 26 is completed by snap assembling the last segment 26p to the first segment 26a in the same manner that the other segments are snap assembled, namely by placing segment 26p inwardly of segment 26a with their respective posts and sockets aligned, and inserting the posts 48 of segment 26p into the slots 66 of segment 26a and moving segment 26p outwardly until its posts 48 snap into the sockets 60 of segment 26a. This assembly method and particularly the final assembly step is facilitated by the limited rocking between adjacent segments which permits the spiral shape shown in FIG. 9 for the final assembly step. The springs 36 and rollers 16 may be assembled to the completed cage or progressively assembled as the cage segments are being assembled.

The limited rocking in conjunction with limited spacing adjustments between adjacent segments allows the assembled cage 26 to adjust in roundness and circumferential dimension for conformity with the annular space between the races 12 and 14 and improved centering.

Although the individual segments of the cage have flexible rails 28 facilitating assembly and the assembled cage 26 is not a rigid annulus, the individual cage segments are located accurately with respect to the outer race 14 because reaction forces of the springs 36 are transferred back to the outer race by the rigid ends of the segments connected by the cross bars 30.

Since the segments are short and relatively unaffected by shrinkage in the circumferential direction, the segments can be molded with highly accurate radial dimensions. This initial accuracy in radial dimension for improved centering in conjunction with the conformatry characteristics of the assembled cage and accurate location of the individual segments via the relatively rigid ends thereof results in very accurate race centering by the cage.

As shown in FIG. 2, the assembled cage 26 also forms a subassembly 26 which retains the rollers 16 in the cage pockets by engagement of the rollers 16 with the surfaces 46 and 72 under the bias of springs 36. Since the surfaces 46 and 72 are on different segments, the segments may be molded in a two part mold as noted previously.

What is claimed is:

1. An overrunning clutch cage for accurately centering concentric clutch races with respect to each other comprising:

a plurality of moldable plastic, arcuate segments joined end-to-end in an annulus, each of said segments having an inner bearing surface and an outer bearing surface and laterally spaced circumferentially aligned rails connected by a cross bar at one end and a radially projecting ear having a reaction surface facing said one end, each of said segments further including a pair of lateral posts and a pair of sockets at opposite ends in interference relationship with a pair of sockets and a pair of posts of adjacent segments respectively, said segments having ones of said pairs disposed on laterally flexible portions of said rails for said ones to clear interferring portions of complementary other ones of said pairs of adjacent segments and snap in locked engagement therewith, and said pairs of sockets being slightly oversized with respect to said posts to permit adjustments of said cage in roundness and circumferential dimension.

2. An overrunning clutch cage for accurately centering concentric clutch races with respect to each other comprising:

a plurality of moldable plastic arcuate segments joined end-to-end in an annulus, each of said segments having concentric inner and outer part cylindrical bearing surfaces laterally spaced circumferentially aligned rails connected by a single cross bar located at one end and a radially outwardly projecting ear having a reaction surface facing said one end, each of said segments in conjunction with an adjacent segment defining a single pocket for receiving a roller and further including a pair of lateral generally rectangular posts at said one end and a pair of generally rectangular sockets at an opposite end in interference relationship with a pair of sockets and a pair of posts of an adjacent segments respectively, said segments having said pairs of sockets disposed on laterally flexible portions of said rails respectively to permit said pairs of posts of adjacent segments to clear interferring portions of said pairs of sockets and snap in locked engagement therewith, each said pair of rails having radial slots in their confronting surfaces which extend from an inner surface of said rails to said sockets for guiding said posts into said sockets, said slots including ramp surfaces for spreading said opposite ends of said rails in cooperation with said posts during insertion of said posts into said socket via said slots, said pairs of sockets being slightly oversized with respect to said posts to permit circumferential adjustment of said cage and limited rocking of adjacent segments for disposition of said segments in a spiral shape in preparation for making the last connection between the segments.

3. The overrunning clutch cage defined in claim 2 wherein said generally rectangular posts and sockets are chordally disposed and said pockets having inner and outer lip means for retaining rollers in said pockets, said outer lip means being located at the ends of said segments opposite said cross bars and having retention surfaces converging toward said cross bars in the radially outward direction, said inner lip means being integral with said cross bars of an adjacent segment having retention surfaces diverging therefrom in the radially inward direction.

4. The overrunning clutch as defined in claim 2 wherein said sockets extend through said end rails and each said pair of rails have second radial slots in their surfaces opposite their confronting surfaces which extend from the outer margin of said rails to said sockets, said first and second slots being in pairs associated with a socket and having bottom surfaces located entirely on opposite sides of an imaginary medial plane extending radially through the associated aperture, said bottom surfaces having no elemental portions closer to said plane than the next elemental portion closer to said socket whereby said sockets may be formed by overlapping fingers of a two part mold.

5. The overrunning clutch as defined in claim 3 wherein said sockets extend through said end rails and each said pair of rails have second radial slots in their surfaces opposite their confronting surfaces which extend from the outer margin of said rails to said sockets, said first and second slots being in pairs associated with a socket and having bottom surfaces located entirely on opposite sides of an imaginary medial plane extending radially through the associated aperture, said bottom surfaces having no elemental portions closer to said plane than the next elemental portion closer to said socket whereby said sockets may be formed by overlapping fingers of a two part mold.

6. In an overrunning clutch cage for accurately centering concentric clutch races with respect to each other, said cage having a number of circumferentially spaced pockets each of which is adapted to receive a roller and comprising:
- a plurality of moldable plastic, arcuate segments corresponding in number to the number of circumferentially spaced pockets, said plurality of moldable plastic arcuate segments being joined end-to-end in an annulus, each of said segments having an inner bearing surface and an outer bearing surface and laterally spaced circumferentially aligned rails connected by a cross bar at one end and a radially projecting ear having a reaction surface facing said one end,
- each of said segments further including a pair of lateral posts and a pair of sockets at opposite ends in interference relationship with a pair of sockets and a pair of posts of adjacent segments respectively, said segments having ones of said pairs disposed on laterally flexible portions of said rails for said ones to clear interfering portions of complementary other ones of said pairs of adjacent segments and snap in locked engagement therewith, and
- said pairs of sockets being slightly oversized with respect to said posts to permit adjustments of said cage in roundness and circumferential dimension.

* * * * *